United States Patent
Pedersen et al.

(10) Patent No.: US 10,258,888 B2
(45) Date of Patent: Apr. 16, 2019

(54) METHOD AND SYSTEM FOR INTEGRATED REAL AND VIRTUAL GAME PLAY FOR MULTIPLE REMOTELY-CONTROLLED AIRCRAFT

(71) Applicant: QFO Labs, Inc., Bloomington, MN (US)

(72) Inventors: Brad D. Pedersen, Minneapolis, MN (US); John P. Condon, Minneapolis, MN (US); James E. Fairman, Bloomington, MN (US)

(73) Assignee: QFO Labs, Inc., Bloomington, MN (US)

( * ) Notice: Subject to any disclaimer, the term of this patent is extended or adjusted under 35 U.S.C. 154(b) by 0 days.

(21) Appl. No.: 15/353,690

(22) Filed: Nov. 16, 2016

(65) Prior Publication Data
US 2017/0173451 A1    Jun. 22, 2017

Related U.S. Application Data

(60) Provisional application No. 62/259,022, filed on Nov. 23, 2015.

(51) Int. Cl.
*A63H 27/00* (2006.01)
*A63H 30/04* (2006.01)
(Continued)

(52) U.S. Cl.
CPC ............ *A63F 13/792* (2014.09); *A63F 13/65* (2014.09); *A63F 13/92* (2014.09); *A63H 27/12* (2013.01);
(Continued)

(58) Field of Classification Search
CPC ........ A63H 27/00; A63H 27/12; A63H 30/04; A63H 2200/00; A63F 13/792; A63F 13/65; A63F 13/92
See application file for complete search history.

(56) References Cited

U.S. PATENT DOCUMENTS

| 129,402 A | 7/1872 | Goodrum |
| 730,097 A | 6/1903 | Crawford et al. |

(Continued)

FOREIGN PATENT DOCUMENTS

| EP | 1245257 A2 | 10/2002 |
| KR | 10-0661618 B1 | 12/2006 |
| WO | WO 2011152702 A1 | 12/2011 |

OTHER PUBLICATIONS

"Wikipedia entry for: Kalman filter", "Downloaded from internet web-page: https://en.wikipedia.org/wiki/Kalman_filter", Publisher: Earliest visible revision-history date, May 18, 2012; most recent revision-history date, Mar. 22, 2017?.

*Primary Examiner* — Gene Kim
*Assistant Examiner* — Alyssa Hylinski
(74) *Attorney, Agent, or Firm* — Jonathan M. Rixen; Charles A. Lemaire; Lemaire Patent Law Firm, P.L.L.C.

(57) ABSTRACT

Gaming systems and methods facilitate integrated real and virtual game play among multiple remote control objects, including multiple remotely-controlled aircraft, within a locally-defined, three-dimensional game space using gaming "apps" (i.e., applications) running on one or more mobile devices, such as tablets or smartphones, and/or a central game controller. The systems and methods permit game play among multiple remotely-controlled aircraft within the game space. Game play may be controlled and/or displayed by a gaming app running on one or more mobile devices and/or a central game controller that keeps track of multiple craft locations and orientations with reference to a locally-defined coordinate frame of reference associated with the game space. The gaming app running on one or more mobile devices and/or central game controller also determine game (Continued)

play among the various craft and objects within the game space in accordance with the rules and parameters for the game being played.

18 Claims, 12 Drawing Sheets

(51) Int. Cl.
    *A63F 13/792* (2014.01)
    *A63F 13/65* (2014.01)
    *A63F 13/92* (2014.01)

(52) U.S. Cl.
    CPC ......... *A63H 30/04* (2013.01); *A63H 2200/00* (2013.01)

(56) References Cited

U.S. PATENT DOCUMENTS

| | | |
|---|---|---|
| 905,547 A | 12/1908 | Macduff |
| 931,966 A | 8/1909 | Sinclair |
| 996,627 A | 7/1911 | Eggert |
| 1,012,631 A | 12/1911 | Gridley |
| 1,291,345 A | 1/1919 | Zimdars |
| 1,405,035 A | 1/1922 | Hunt |
| 1,816,707 A | 7/1931 | Wardell |
| 1,911,041 A | 5/1933 | Smyser |
| 1,959,270 A | 5/1934 | Hedloff |
| 2,077,471 A | 4/1937 | Fink |
| 2,461,435 A | 2/1949 | Neumann et al. |
| 2,567,392 A | 9/1951 | Naught |
| 2,728,537 A | 12/1955 | Elkins |
| 2,730,311 A | 1/1956 | Doak |
| 2,863,261 A | 12/1958 | Mead |
| 2,876,965 A | 3/1959 | Streib |
| 2,949,693 A | 8/1960 | McRoskey |
| 2,953,321 A | 9/1960 | Robertson et al. |
| 2,968,318 A | 1/1961 | Bauman |
| 2,968,453 A | 1/1961 | Bright |
| 2,988,301 A | 6/1961 | Fletcher |
| 3,002,709 A | 10/1961 | Cochran |
| 3,199,809 A | 8/1965 | Modesti |
| 3,394,906 A | 7/1968 | Rogers |
| 3,395,876 A | 8/1968 | Green |
| 3,402,488 A | 9/1968 | Leavitt |
| 3,442,469 A | 5/1969 | Davis |
| 3,477,168 A | 11/1969 | Trodglen, Jr. |
| 3,503,573 A | 3/1970 | Modesti |
| 3,508,360 A | 4/1970 | Williams |
| 3,528,284 A | 9/1970 | Skoglund et al. |
| 3,568,358 A | 3/1971 | Bruce |
| 3,608,033 A | 9/1971 | Hall |
| 3,677,503 A | 7/1972 | Freemen, Jr. |
| 3,752,417 A | 8/1973 | Lagace |
| 3,933,325 A | 1/1976 | Kaelin |
| 3,946,970 A | 3/1976 | Blankenship |
| 4,065,873 A | 1/1978 | Jones |
| 4,161,843 A | 7/1979 | Hui |
| 4,196,877 A | 4/1980 | Mutrux |
| 4,214,720 A | 7/1980 | De Sautel |
| 4,232,865 A | 11/1980 | Chen et al. |
| 4,273,302 A | 6/1981 | Jordan |
| 4,386,748 A | 6/1983 | Jordan |
| 4,457,476 A | 7/1984 | Andresevitz |
| 4,461,436 A | 7/1984 | Messina |
| 4,566,699 A | 1/1986 | Cucuzza |
| D292,194 S | 10/1987 | Moller |
| 4,778,128 A | 10/1988 | Wright et al. |
| 4,795,111 A | 1/1989 | Moller |
| 4,796,836 A | 1/1989 | Buchelt |
| 4,804,156 A | 2/1989 | Harmon |
| 4,880,071 A | 11/1989 | Tracy |
| 4,955,962 A | 9/1990 | Mell |
| 5,035,377 A | 7/1991 | Buchelt |
| 5,049,031 A | 9/1991 | Mintenko et al. |
| 5,064,143 A | 11/1991 | Bucher |
| 5,071,383 A | 12/1991 | Kinoshita |
| 5,072,892 A | 12/1991 | Carrington |
| 5,082,079 A | 1/1992 | Lissaman et al. |
| 5,150,857 A | 9/1992 | Moffitt et al. |
| 5,152,478 A | 10/1992 | Cycon et al. |
| 5,178,344 A | 1/1993 | Dlouhy |
| 5,203,521 A | 4/1993 | Day |
| 5,213,284 A | 5/1993 | Webster |
| 5,259,571 A | 11/1993 | Blazquez |
| 5,277,380 A | 1/1994 | Cycon et al. |
| 5,295,643 A | 3/1994 | Ebbert et al. |
| 5,297,759 A | 3/1994 | Tilbor et al. |
| 5,351,911 A | 10/1994 | Neumayr |
| 5,383,363 A | 1/1995 | Kulmaczewski |
| 5,407,150 A | 4/1995 | Sadleir |
| 5,421,538 A | 6/1995 | Vassa |
| 5,429,542 A | 7/1995 | Britt, Jr. |
| 5,440,817 A | 8/1995 | Watson et al. |
| 5,503,351 A | 4/1996 | Vass |
| 5,575,438 A | 11/1996 | McGonigle et al. |
| 5,634,839 A | 6/1997 | Dixon |
| 5,672,086 A | 9/1997 | Dixon |
| 5,676,344 A | 10/1997 | Graffin |
| 5,746,930 A | 5/1998 | Belcher et al. |
| 5,854,843 A | 12/1998 | Jacknin et al. |
| 5,873,545 A | 2/1999 | Kapin et al. |
| 5,890,441 A | 4/1999 | Swinson et al. |
| 5,971,320 A | 10/1999 | Jermyn et al. |
| 5,988,562 A | 11/1999 | Linick |
| 6,050,250 A | 4/2000 | Kerkau |
| 6,053,451 A | 4/2000 | Yu |
| 6,179,247 B1 | 1/2001 | Milde, Jr. |
| 6,224,452 B1 | 5/2001 | Morse |
| 6,227,485 B1 | 5/2001 | Porte |
| 6,254,032 B1 | 7/2001 | Bucker |
| 6,260,796 B1 | 7/2001 | Klingensmith |
| 6,270,036 B1 | 8/2001 | Lowe, Jr. |
| 6,270,038 B1 | 8/2001 | Cycon et al. |
| 6,273,370 B1 | 8/2001 | Colgren |
| 6,302,229 B1 | 10/2001 | Triebel |
| 6,302,796 B1 | 10/2001 | Lebensfeld et al. |
| 6,332,103 B1 | 12/2001 | Steenson, Jr. et al. |
| 6,371,406 B1 | 4/2002 | Corcoran |
| 6,375,117 B1 | 4/2002 | Cain |
| 6,398,159 B1 | 6/2002 | Di Stefano |
| 6,421,622 B1 | 7/2002 | Horton et al. |
| 6,431,494 B1 | 8/2002 | Kinkead et al. |
| 6,450,445 B1 | 9/2002 | Moller |
| 6,450,446 B1 | 9/2002 | Holben |
| 6,457,670 B1 | 10/2002 | Geranio et al. |
| 6,464,166 B1 | 10/2002 | Yoeli |
| D465,196 S | 11/2002 | Dammar |
| 6,539,290 B1 | 3/2003 | Vos |
| 6,547,180 B1 | 4/2003 | Cassidy |
| 6,572,053 B2 | 6/2003 | Salas |
| 6,575,401 B1 | 6/2003 | Carver |
| 6,581,872 B2 | 6/2003 | Walmsley |
| 6,588,701 B2 | 7/2003 | Yavnai |
| 6,592,071 B2 | 7/2003 | Kinkead et al. |
| 6,604,706 B1 | 8/2003 | Bostan |
| 6,609,945 B2 | 8/2003 | Jiminez et al. |
| 6,626,078 B2 | 9/2003 | Thornton |
| 6,688,936 B2 | 2/2004 | Davis |
| 6,694,228 B2 | 2/2004 | Rios |
| 6,708,920 B2 | 3/2004 | Fukuyama |
| 6,735,500 B2 | 5/2004 | Nicholas et al. |
| 6,743,101 B2 | 6/2004 | Leifer et al. |
| 6,761,637 B2 | 7/2004 | Weston |
| 6,824,095 B2 | 11/2004 | Mao |
| 6,843,447 B2 | 1/2005 | Morgan |
| 6,843,699 B2 | 1/2005 | Davis |
| 6,899,586 B2 | 5/2005 | Davis |
| 7,017,911 B1 | 3/2006 | Chia |
| 7,032,861 B2 | 4/2006 | Sanders, Jr. et al. |
| 7,127,333 B2 | 10/2006 | Arvidsson |
| 7,255,623 B2 | 8/2007 | Davis |
| 7,488,231 B2 | 2/2009 | Weston |
| 7,491,111 B2 | 2/2009 | Ghaly |

(56) References Cited

U.S. PATENT DOCUMENTS

| | | |
|---|---|---|
| 7,497,759 B1 | 3/2009 | Davis |
| 7,500,917 B2 | 3/2009 | Barney |
| 7,614,958 B2 | 11/2009 | Weston |
| 7,704,119 B2 | 4/2010 | Evans |
| 7,758,399 B2 * | 7/2010 | Weiss .................. A63H 17/00 235/462.03 |
| 7,793,890 B2 | 9/2010 | Scherer |
| 7,794,302 B2 | 9/2010 | Davis |
| 7,931,239 B2 | 4/2011 | Pedersen et al. |
| 8,019,447 B2 | 9/2011 | Hoisington et al. |
| 8,049,600 B2 | 11/2011 | Beard et al. |
| 8,109,802 B2 | 2/2012 | Chui et al. |
| 8,200,375 B2 | 6/2012 | Stuckman et al. |
| 8,214,088 B2 | 7/2012 | Lefebure |
| 8,328,128 B2 | 12/2012 | Wiggerich |
| 8,337,308 B2 | 12/2012 | Ito et al. |
| 8,473,123 B2 | 6/2013 | Sun et al. |
| 8,473,125 B2 | 6/2013 | Rischmuller et al. |
| 8,474,761 B2 | 7/2013 | Callou |
| 8,498,447 B2 | 7/2013 | Derbanne |
| 8,574,020 B2 | 11/2013 | Smith |
| 8,599,646 B2 | 12/2013 | Pochon |
| 8,662,438 B2 | 3/2014 | Savoye et al. |
| 8,725,314 B2 | 5/2014 | Chaperon et al. |
| 8,818,083 B2 | 8/2014 | Jonchery et al. |
| 8,958,928 B2 | 2/2015 | Seydoux |
| 8,983,684 B2 | 3/2015 | Callou et al. |
| 9,011,250 B2 * | 4/2015 | Condon ................. A63H 13/00 463/2 |
| 9,073,532 B2 | 7/2015 | Spirov et al. |
| 9,630,100 B2 * | 4/2017 | Condon ................ G05D 1/0033 |
| 2002/0104921 A1 | 8/2002 | Louvel |
| 2002/0142701 A1 | 10/2002 | Rosenberg |
| 2002/0145563 A1 * | 10/2002 | Kane .................... A61B 5/1038 342/442 |
| 2005/0186884 A1 * | 8/2005 | Evans ................... A63H 17/14 446/456 |
| 2007/0105474 A1 | 5/2007 | Goutou et al. |
| 2008/0108273 A1 | 5/2008 | Alden |
| 2009/0005167 A1 * | 1/2009 | Arrasvuori .......... A63H 33/042 463/40 |
| 2009/0284553 A1 * | 11/2009 | Seydoux ................ A63F 13/10 345/649 |
| 2010/0009735 A1 | 1/2010 | Seydoux |
| 2010/0178966 A1 * | 7/2010 | Seydoux ................ A63F 13/10 463/2 |
| 2010/0178982 A1 * | 7/2010 | Ehrman ................ A63F 7/0664 463/37 |
| 2011/0049290 A1 | 3/2011 | Seydoux |
| 2012/0056041 A1 | 3/2012 | Rhee et al. |
| 2012/0221179 A1 | 8/2012 | Lee et al. |
| 2012/0241555 A1 | 9/2012 | Savoye et al. |
| 2013/0190090 A1 | 7/2013 | Lin |
| 2013/0324250 A1 * | 12/2013 | Sofman .................. A63H 30/04 463/31 |
| 2014/0057527 A1 * | 2/2014 | Fessenmaier .......... A63H 30/04 446/484 |
| 2014/0100037 A1 * | 4/2014 | Condon ................ G05D 1/0033 463/40 |
| 2014/0287806 A1 * | 9/2014 | Balachandreswaran ..................... A63F 13/00 463/7 |
| 2015/0080121 A1 * | 3/2015 | Garlington ............. A63H 30/04 463/31 |
| 2016/0121232 A1 * | 5/2016 | Ji .......................... A63H 30/04 463/40 |
| 2016/0250535 A1 * | 9/2016 | Yatsko .................. A63H 27/12 273/317.1 |

* cited by examiner

FIG. 7B $$x_k = f(x_{k-1}, u_{k-1}) + w_{k-1}$$
$$z_k = h(x_k) + v_k$$

Predict

Predicted state estimate $\quad \hat{x}_{k|k-1} = f(\hat{x}_{k-1|k-1}, u_{k-1})$ Predicted covariance estimate $\quad P_{k|k-1} = F_{k-1} P_{k-1|k-1} F_{k-1}^\top + Q_{k-1}$

Update

Innovation or measurement residual $\quad \tilde{y}_k = z_k - h(\hat{x}_{k|k-1})$ Innovation (or residual) covariance $\quad S_k = H_k P_{k|k-1} H_k^\top + R_k$ Near-optimal Kalman gain $\quad K_k = P_{k|k-1} H_k^\top S_k^{-1}$ Updated covariance estimate $\quad P_{k|k} = (I - K_k H_k) P_{k|k-1}$ Updated state estimate $\quad \hat{x}_{k|k} = \hat{x}_{k|k-1} + K_k \tilde{y}_k$

701

METHOD AND SYSTEM FOR INTEGRATED REAL AND VIRTUAL GAME PLAY FOR MULTIPLE REMOTELY-CONTROLLED AIRCRAFT

CROSS-REFERENCE TO RELATED APPLICATION

This application claims priority benefit, under 35 U.S.C. § 119(e), of U.S. Provisional Patent Application No. 62/259,022 filed Nov. 23, 2015 by Brad D. Pedersen et al., titled "Method and system for integrated real and virtual game play for multiple remotely-controlled aircraft," which is incorporated herein by reference in its entirety.

TECHNICAL FIELD

The invention relates generally to the fields of heavier-than-air aeronautical vehicles that are sustained in air by the force of a fluid such as air and remote control game play. More particularly, the present invention relates to three-dimensional game play among multiple remote control objects, including multiple remotely-controlled aircraft.

BACKGROUND

Remotely-controlled aircraft are becoming increasingly more popular and sophisticated. While larger remotely-controlled aircraft such as military and civilian drones have been in use for only the last two decades, smaller remotely-controlled flying craft built and flown by hobbyists have been around for much longer. Generally, remotely-controlled aircraft are either fixed wing, like a plane, or hovering, like a helicopter or quadcopter.

Game play among remote control objects traditionally involved racing or driving games for remote control model cars or boats. The game players each have a remote controller that communicates with a remote control model craft using relatively simple control commands (e.g., turn left/right, go faster/slower, go forward/backward). Control of the craft during game play was originally based on the player's visual observation of the craft in a two-dimensional game space (e.g., a surface or area such as a track, a terrain, a pond, or a pool). The addition of a camera and display screen augmented the remote control game play to provide a virtual game play option. Examples of these two-dimensional remote control game play systems that included virtual game play capabilities include U.S. Pat. Nos. 6,293,798, 6,752,720, 7,704,119, and 8,216,036, and U.S. Pub. Nos. 2006/0223637 and 2009/0005167. An example of a two-dimensional remote control game play systems with video displays on each remote controller for controlling tanks that fired infrared or laser offensive signals from tanks that can be tracked by pressure sensors arrayed under a two-dimensional play space mat is shown in U.S. Pat. No. 7,704,119. A more recent version of this kind of two-dimensional remote control tank battle game in which the controllers can be implemented using a mobile device such as a tablet or smartphone is shown in U.S. Pub. No. 2013/0190090. Additional improvements to remote control model car gaming systems have added sensor and imaging features to enhance the control of a remote control vehicle and maintain parity between real and virtual representations of physical gaming components in a generally two-dimensional game space, as shown, for example, in U.S. Pat. Nos. 8,353,737, 8,845,385, and 8,882,560.

Other forms of real and virtual generally two-dimensional game space and game play have been developed. One segment of these gaming arrangements has focused on what is referred to as the "Toys to Life" market. Examples of these integrated real and virtual gaming arrangements using a game board and/or objects with radio-frequency identification (RFID) tags are shown, for example, in U.S. Pat. Nos. 8,475,275, 8,753,195, and 8,821,820. Another segment of these real and virtual gaming arrangements has focused on real-world players with virtual games that use the real-world locations of the players, as shown, for example, in U.S. Pat. No. 9,033,803 and U.S. Pub. Nos. 2003/0177187, 2007/0190494, and 2008/0146338.

More recently, remote control game play has been expanded to incorporate remotely-controlled aircraft into the game play. In order to support remote control game play in a three-dimensional game space with remotely-controlled aircraft, as well as other vehicles, devices and accessories used as part of game play, more sophisticated control systems are required than those developed for two-dimensional game space and game play arrangements.

The presentation of images associated with real objects and craft from a three-dimensional environment on a player's tablet or smartphone is one challenge facing the development of three-dimensional game play among multiple remotely-controlled aircraft. U.S. Pub. No. 2014/0051513 describes a system for detecting, controlling, and displaying objects using a mobile device, such as a tablet or smartphone. The system uses a camera in the mobile device and tracks the objects in such a way as to display a virtual representation of the object as a different image on a display screen of the mobile device. U.S. Pub. No. 2010/0009735 describes a video game system for a remotely-controlled aircraft in which a craft includes an inertial sensing unit that senses the attitude of the craft and the displayed images on a mobile device is adjusted in response. U.S. Pub. No. 2010/00178966 describes a video game system for a remotely-controlled aircraft in which a mobile device uses video analysis of on-board camera images and flashing LED lights on the craft to determine whether or not there has been a hit in the virtual video game. U.S. Pat. No. 8,818,083 describes a similar system that uses strips of different colors mounted on a remotely controlled drone equipped with forward-facing cameras to identify and confirm whether shots made in virtual game environment are hitting or missing their target. These systems, however, determine orientation, and not distance, relative to the other craft, and not relative to a shared local coordinate system. Challenges remain on how to make the user interface and gaming experience fun and engaging for three-dimensional game play among multiple remotely-controlled aircraft.

Another significant challenge is the problem of locating and tracking with proper resolution the positions and orientations of multiple craft and objects within a three-dimensional gaming space. U.S. Pub. No. 2009/0284553 was one of the first to recognize the need for dynamic position sensing of a remotely-controlled aircraft in a three-dimensional gaming space.

Global Positioning Satellite (GPS) transceivers can track craft and objects outdoors, however, these kinds of GPS solutions may not provide the proper resolution of position and orientation required for three-dimensional gaming among multiple craft and players. In addition, solutions relying on GPS will not work if the three-dimensional gaming space is indoors. Indoor tracking of drones and other flying craft has been accomplished by external motion capture and imaging analysis systems, for example, to continuously track the position of the craft within a predefined indoor space. Generally, this kind of external localization system requires sophisticated equipment with multiple cameras, computer systems and advanced software programs.

Simultaneous location and mapping (SLAM) techniques based on on-board video and sensor information are used to allow individual automated craft or robots to acquire an understanding of a surrounding and navigate in response without the need for an external localization system to track and communicate positional information to the craft of robot. While SLAM techniques are particularly useful for autonomous control of swarms of drones or robots, these techniques are generally less relevant to real and virtual gaming environments involving player remote control of a craft.

U.S. Pub. No. 2009/0284553 recognized the need for dynamic position sensing of a remotely-controlled aircraft in a three-dimensional gaming space, and described the use of GPS and an inertial unit and on-board cameras in the craft to determine actual Earth coordinates and a local frame of reference. Together with GPS and dead reckoning based on a starting point of the craft, positional information of the aircraft was determined and then used to download corresponding aerial images to define a game space in which a virtual game may be played. Unfortunately, the techniques presented in this published application for obtaining the positional information information and the appropriate resolution of that information were not well suited for smaller scale or indoor three-dimensional game play, and there was no ability to coordinate the positional information to determine the positions and actions of other remotely-controlled craft within the three-dimensional game space.

U.S. Pat. Nos. 9,004,973 and 9,011,250 describe a three-dimensional remotely-controlled aircraft gaming system that can selectively assign different players to different teams, and in various embodiments uses two different communication systems, such as infrared (IR) and radio frequency (RF) communications, to implement remote control of the aircraft by the players and coordinate the three-dimensional game play system.

All patents and patent application publications referenced in this entire specification are incorporated herein by reference.

In spite of these advances, there remains a need for improvements to systems and methods that can enhance three-dimensional game play among multiple remote control objects, including multiple remotely-controlled aircraft.

SUMMARY

Systems and methods are described for facilitating integrated real and virtual game play among multiple remote control objects, including multiple remotely-controlled aircraft, within a locally-defined, three-dimensional game space using gaming "apps" (i.e., applications) running on one or more mobile devices, such as tablets or smartphones, and/or a central game controller. The systems and methods permit game play among multiple remotely-controlled aircraft within the game space.

In various embodiments, a player operates a remotely-controlled aircraft in the game space using a uniquely paired remote controller that may be a handheld controller or an app running on a mobile device. Game play may be controlled and/or displayed by a gaming app running on one or more mobile devices and/or a central game controller that keeps track of multiple craft locations and orientations with reference to a locally-defined coordinate frame of reference associated with the game space. The gaming app running on one or more mobile devices and/or central game controller also determine game play among the various craft and objects within the game space in accordance with the rules and parameters for the game being played.

In accordance with various embodiments, a variety of games may be supported by the systems and methods described, such as those with first-person shooter, racing, obstacles, challenge, and/or building actions. At least some of the gaming actions may occur within the three-dimensional real world game space and are associated with a remotely-controlled aircraft, whereas others may be represented in the virtual gaming environment running on the mobile device. In some embodiments, the gaming app is configured to permit players to earn and/or purchase various enhancements or options within a given game that may affect the parameters controlling game play, such as duration, cost, strength, or distance of various offensive and defensive actions.

In some embodiments, the positional information associated with remotely-controlled aircraft operating within the game space are determined with reference to at least three fiducial elements that are used by the gaming app and/or game controller to locally define the three-dimensional game space, and by the craft to determine data related to positional and attitude information within a frame of reference defined by the game space that is communicated to the gaming app and/or game controller.

In various embodiments, a combination of passive and active fiducial elements to define a relatively smaller game space in which sensor information from the craft can be integrated with external information about this game space. This integrated information is provided to a gaming controller preferably integrated with a mobile device gaming app which manages game play and communicates among the various players and craft. The use of a gaming app on a mobile device as the main interface and controller for the 3-D game play opens up the potential for in-app purchases of enhancements and options that can provide an ongoing revenue stream over the life of the product.

The above summary is not intended to describe each illustrated embodiment or every implementation of the subject matter hereof. The figures and the detailed description that follow more particularly exemplify various embodiments.

BRIEF DESCRIPTION OF THE DRAWINGS

FIGS. 7A and 7B, together, are an exemplary set 701 of prediction and update algorithms and formulas that are used in some embodiments of locating engine 601.

Figure 1:
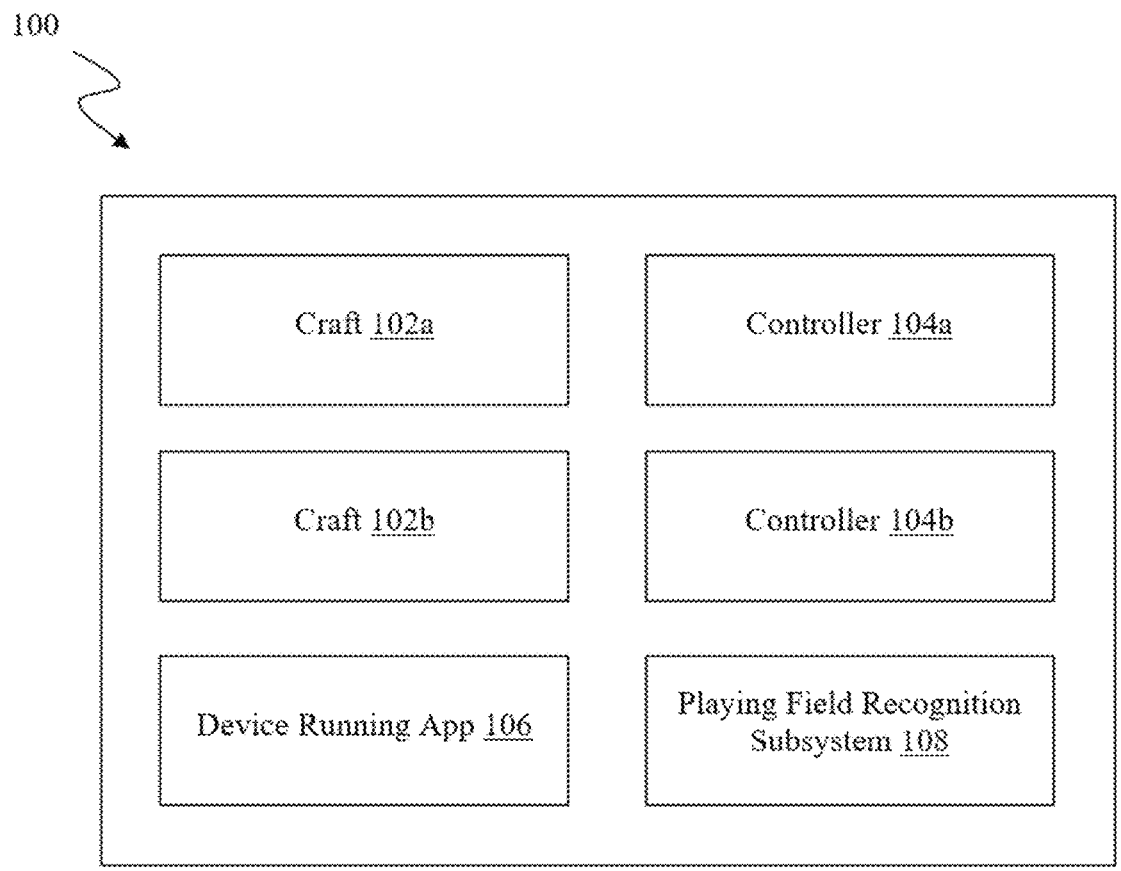
FIG. 1 is a block diagram of a three-dimensional gaming system for multiple remotely-controlled aircraft, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a gaming system 100 for multiple remotely-controlled aircraft is depicted. Gaming system 100 generally comprises a first craft 102a configured to be controlled by a first controller 104a, a second craft 102b configured to be controlled by a second controller 104b, a mobile device 106 running a gaming app, and a game space recognition subsystem 108. Generally, gaming system 100 allows for enhanced game play between first craft 102a and second craft 102b using integrated virtual components on mobile device 106.

In some embodiments, craft 102 is a hovering flying craft adapted to be selectively and unique pair with and controlled by a handheld remote controller, such as controller 104. In one embodiment, a hovering flying craft 102 has a frame assembly that includes a plurality of arms extending from a center body with an electric motor and corresponding propeller on each arm. The frame assembly carries a battery together with electronics, sensors and communication components. These may include one or more gyroscopes, accelerometers, magnetometers, altimeters, ultrasounds sensors, downward facing camera and/or optical flow sensors, forward-facing camera and/or LIDAR sensors, processors, and/or transceivers.

In some embodiments, controller 104 is a single-handed controller to be used by a user for controlling a craft 102. In one embodiment, controller 104 has a controller body configured to be handheld and having an angled shape and including a flat top surface for orientation reference of the controller, a trigger mechanism projecting from the controller body adapted to interface with a finger of the user, a top hat projecting from the flat top surface adapted to interface with a thumb of the user, and a body, processor, electronics and communication components housed within the controller body.

For a more detailed description of aspects of one embodiment of craft 102 and controller 104, reference is made to U.S. Pat. No. 9,004,973, by John Paul Condon et al., titled "Remote-Control Flying Copter and Method," the detailed specification and figures of which are hereby incorporated by reference.

While embodiments of the present invention are described with respect to a smaller, hovering remotely-controlled aircraft in wireless communication with a paired wireless controller configured for single-handed tilt-control operations, it will be understood that other embodiments of the communications system for game play in accordance with the present invention may include other types of remotely-controlled flying craft, such as planes or helicopters, or other non-flying remote-control craft, such as cars or boats, and may also include other types of remote controllers, such as a conventional dual joystick controller or a tilt-control based on an "app" (i.e., an application) running on a mobile device or a software programming running on a laptop or desktop computer, as will be described.

In an embodiment, second craft 102b is substantially similar to first craft 102a. In such embodiments, second controller 104 is substantially similar to first controller 104a and is configured to control second craft 102b. In other embodiments, second craft 102b comprises a flying craft that is a different type than first craft 102a. In embodiments, multiple types of flying craft can be used in the same game space.

Device 106 is configured to execute a gaming application. In an embodiment, device 106 comprises a smartphone, tablet, laptop computer, desktop computer, or other computing device. For example, device 106 can comprise a display, memory, and a processor configured to present a gaming application on the display. In embodiments, device 106 comprises communication or network interface modules for interfacing to other components of gaming system 100. Typically, device 106 is mobile to allow players to set up a game space in nearly any environment or space, such as an outdoor space like a field or parking lot, or an indoor space like a gymnasium or open room. However, device 106 can also be stationary instead of mobile, such that players can bring their craft to a preexisting game space defined proximate the device 106.

In some embodiments, device 106 can further be configured by the player to selectively control one of craft 102a or craft 102b such that the functionality of either controller 104a or controller 104b is integrated into device 106. In other embodiments, device 106 can be integrated with game space recognition subsystem 108 such that the functionality of device 106 and game space recognition subsystem 108 are integrated into one device.

Game space recognition subsystem 108 is configured to determine a relative position and orientation of first craft 102a and second craft 102b within a three-dimensional game space. In an embodiment, game space recognition subsystem 108 comprises a plurality of fiducial elements, a mapping engine, and a locating engine, as will be described.

Figure 2:
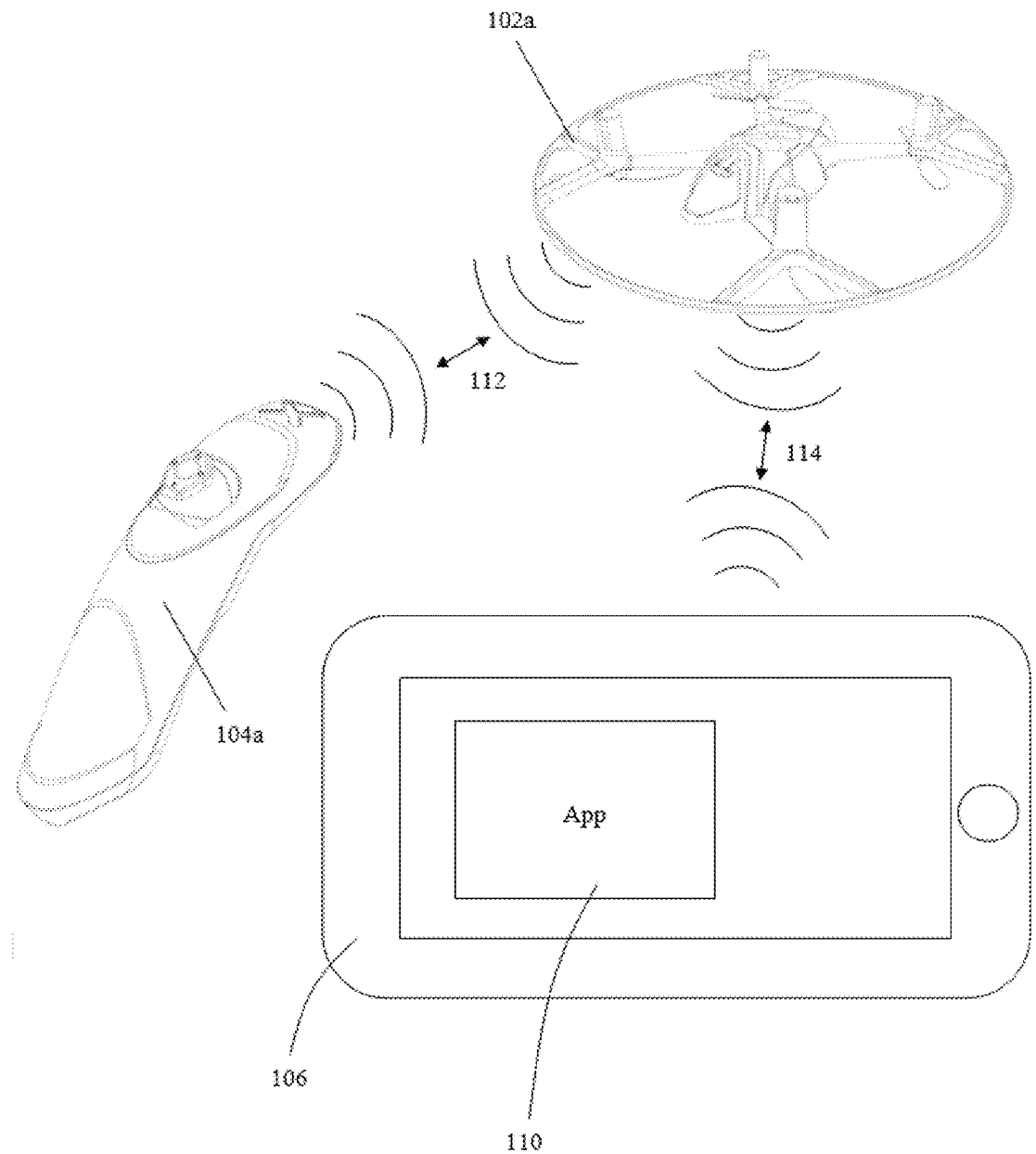
FIG. 2 is a diagram of a portion of gaming system for multiple remotely-controlled aircraft utilizing a computing device running an application, according to an embodiment.

Referring to FIG. 2, a diagram of a portion of gaming system 100 for multiple remotely-controlled aircraft utilizing computing device 106 is depicted, according to an embodiment. As shown, gaming system 100 partially comprises first craft 102a, first controller 104a, and device 106.

Device 106 comprises computing hardware and software configured to execute application 110. In other embodiments, device 106 further comprises computing hardware and software to store application 110. Application 110 generally comprises software configured for game-based interaction with first craft 102a, including display of first craft 102a relative to the executed game. Application 110 can include a relative location in a two-dimensional application display space that approximates the location of first craft 102a in the three-dimensional game space space. For example, if first craft 102a is in the northeast corner of the game space space, application 110 can depict first craft 102a as being in the upper right corner of the application display space. Likewise, if first craft 102a is in the southwest corner of the game space space, application 110 can depict first craft 102a as being in the lower left corner of the application display space.

Application 110 can further include gaming elements relative to the game being played, such as heath zones, danger zones, or safe or "hide-able" zones. For example, referring to FIG. 3A, a diagram of real-world interaction of multiple remotely-controlled aircraft within a game space 200 is depicted, according to an embodiment. As depicted, first craft 102a and second craft 102b are positioned or hovering within game space 200. Game space 200 comprises a three-dimensional gaming area in which first craft 102a and second craft 102b can move around in X, Y, and Z axes. In an embodiment, first craft 102a and second craft 102b are controlled within game space 200 by controller 104a and second controller 104b, respectively (not shown). In embodiments of game play, leaving the game space 200 may be considered entering a restricted or hidden zone, and may be done with or without a penalty. In other embodiments, sensors are positioned within game space 200 to restrict the ability of first craft 102a and second craft 102b to leave game space 200. For example, a craft touching one of the "sides" of game space 200 might engage a sensor configured to transmit a command to the craft that artificially weakens or disables the flying ability of the craft.

Figure 3A:
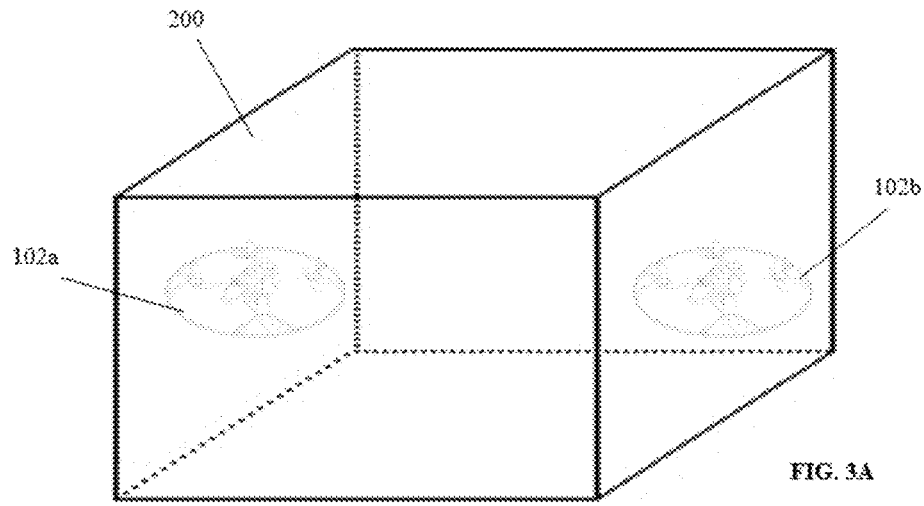
FIG. 3A is a diagram of a real-world interaction of multiple remotely-controlled aircraft within a game space, according to an embodiment
Figure 3B:
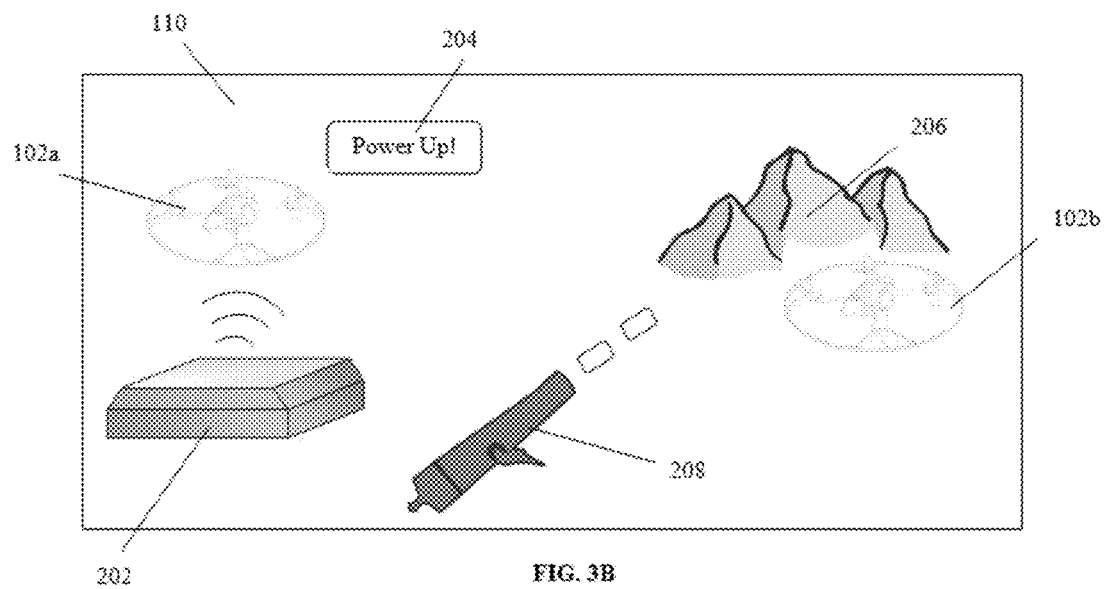
FIG. 3B is an illustration of an application that integrates the real-world interaction of multiple remotely-controlled aircraft of FIG. 3A with a virtual world of the application, according to an embodiment.

FIG. 3B is an illustration of an application such as application 110 that integrates the real-world interaction of first craft 102a and second craft 102b of FIG. 3A with a virtual world of application 110, according to an embodiment. For example, application 110 can visually depict first craft 102a and second craft 102b within the application display. Further, application 110 can include other visual elements that first craft 102a and second craft 102b can interface with within application 110. For example, as depicted, first craft 102a is positioned proximate a health zone 202. A user might recognize a health zone 202 within the virtual environment of application 110 and physically command first craft 102a near health zone 202. In an embodiment, within the game play of application 110, first craft 102a could gain a relative advantage to the other craft not positioned proximate health zone 202. In embodiments, various display communication such as text 204 can visually indicate interaction with health zone 202.

In another example, second craft 102b can be positioned proximate a hiding zone, such as virtual mountains 206. In such embodiments, second craft 102b can be "protected" within the game play from, for example, cannon 208. While proximate mountains 206 within application 110 as interpreted within game space 200, second craft 102b can be safe from the "shots" fired by cannon 208. In other embodiments, while positioned proximate mountains 206 within application 110, second craft 102b can be safe from any "shots" fired by first craft 102a. In embodiments, physical markers or beacons representing the various virtual elements within application 110 can be placed on game space 200. One skilled in the art will readily appreciate that interplay between first craft 102a and second craft 102b on physical game space 200 as represented within application 110 is essentially unlimited. Any number of games or game components can be implemented in both game space 200 and on application 110.

Referring again to FIG. 2, first craft 102a is in wireless communication with first controller 104a over craft control channel 112. The wireless communication over craft control channel 110 can be by any suitable protocol, such as infrared (IR), Bluetooth, radio frequency (RF), or any similar protocol. Additionally, first craft 102a is in wireless communication with device 106 over gaming channel 114. Wireless communication over craft gaming channel 114 can likewise be by any suitable protocol, such as infrared (IR), Bluetooth, radio frequency (RF), or any similar protocol. In an embodiment, device 106 comprises both controller 104a functionality and application 110 functionality. For ease of explanation, second craft 102b and second controller 104b are not depicted, but may include similar interfaces and communication schemes as first craft 102a and first controller 104a as described herein, or may include interfaces as well communication schemes that, while not similar, are compatible with at least the other communication schemes used by other craft and objects in the gaming space.

Figure 4:
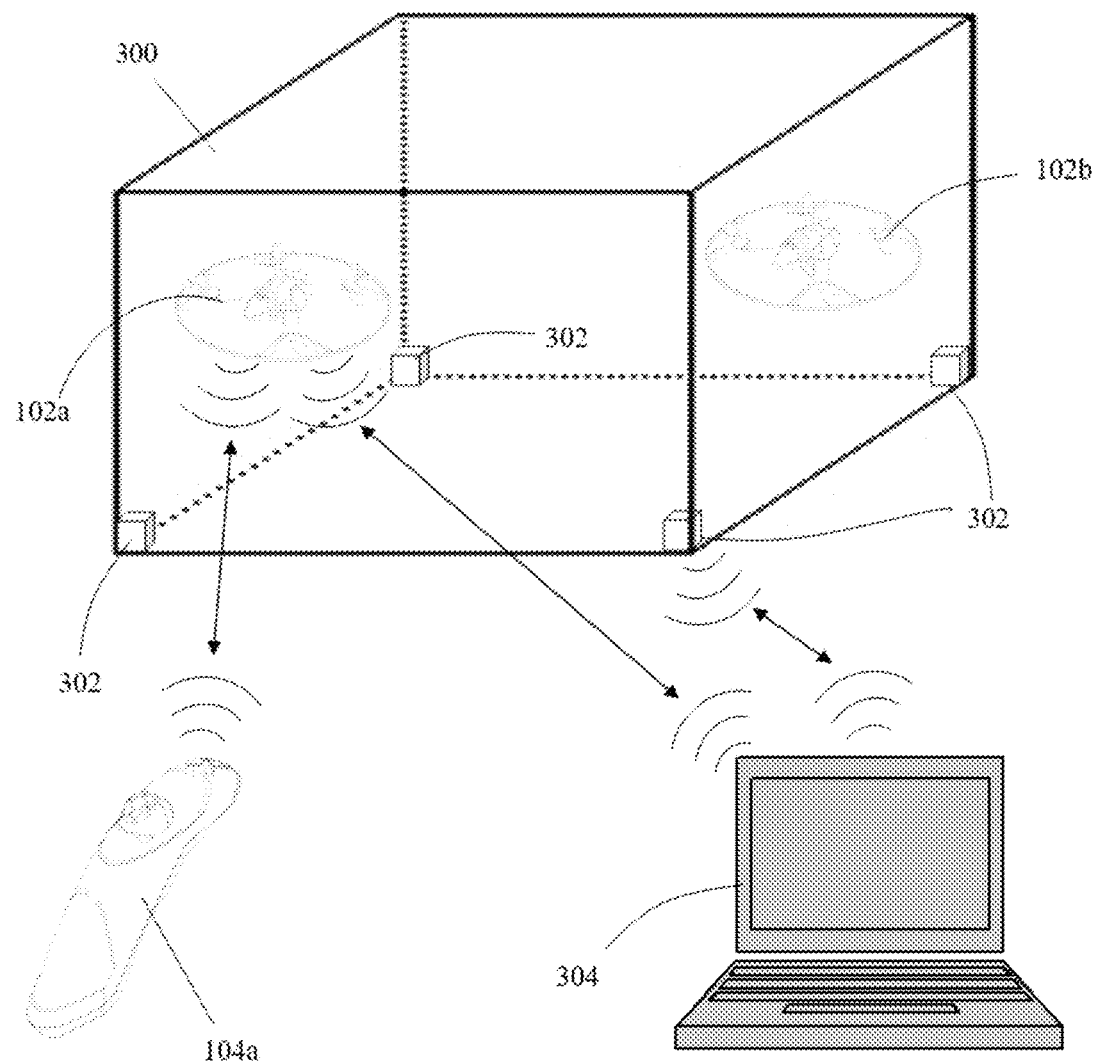
FIG. 4 is a diagram of a portion of a gaming system for multiple remotely-controlled aircraft within a game space, according to an embodiment.

Referring to FIG. 4, a diagram of a portion of a gaming system for multiple remotely-controlled aircraft within a game space is depicted, according to an embodiment. Game space 300 comprises a three-dimensional gaming area similar to game space 200 described with respect to FIG. 3A. In an embodiment, first craft 102a and second craft 102b are controlled within game space 200 by controller 104a and second controller 104b (not shown), respectively.

A plurality of fiducial beacons 302, 402, 502 are provided to define game space 300. In various configurations and embodiments, these fiducial beacons 302 (active), 402 (passive), 502 (smart) are used by game space recognition subsystem 108 to locate each of the craft within game space 300, as will be described. It will be understood that the game space 300 is bounded and defined at least in part by the fiducial beacons such that the game space 300 represents a finite space. Although the game space 300 may be either indoors or outdoors as will be described, the overall volume of the game space 300 is limited and in various embodiments may correspond to the number, size and range of the remotely-controlled aircraft. For smaller aircraft and a smaller number of such aircraft in play, the overall volume of game space 300 may be suitable for indoor play in an area, for example, that could be 20 feet wide by 30 feet long by 10 feet high. With a larger number of craft, an overall volume of game space 300 may correspond to a typical size of a basketball court (90 feet by 50 feet) together with a height of 20 feet. For outdoor configurations, the overall game volume may be somewhat larger and more irregular to accommodate a variety of terrain and natural obstacles and features, although the game volume is typically constrained in various embodiments to both line of sight distances and distances over which the remotely-controlled aircraft are still reasonably visible to players positioned outside the game space 300.

Gaming controller station 304 comprises computing hardware and software configured to execute a gaming application. In other embodiments, game control device 304 further comprises computing hardware and software to store the gaming application. In an embodiment, game control device 304 is substantially similar to device 106 of FIG. 2. As depicted, gaming controller station 304 is communicatively coupled to first craft 102a and second craft 102b. For ease of illustration, only the linking between first craft 102a and gaming controller station 304 is shown in FIG. 4, but one skilled in the art will readily understand that second craft 102b is similarly communicatively coupled to gaming controller station 304.

In another embodiment, gaming controller station 304 further comprises computing hardware and software configured to execute game space recognition subsystem 108. In an embodiment, gaming controller station 304 can be communicatively coupled to active fiducial beacons 302 or smart fiducial beacons 502 to transmit and receive location information.

Figure 5:
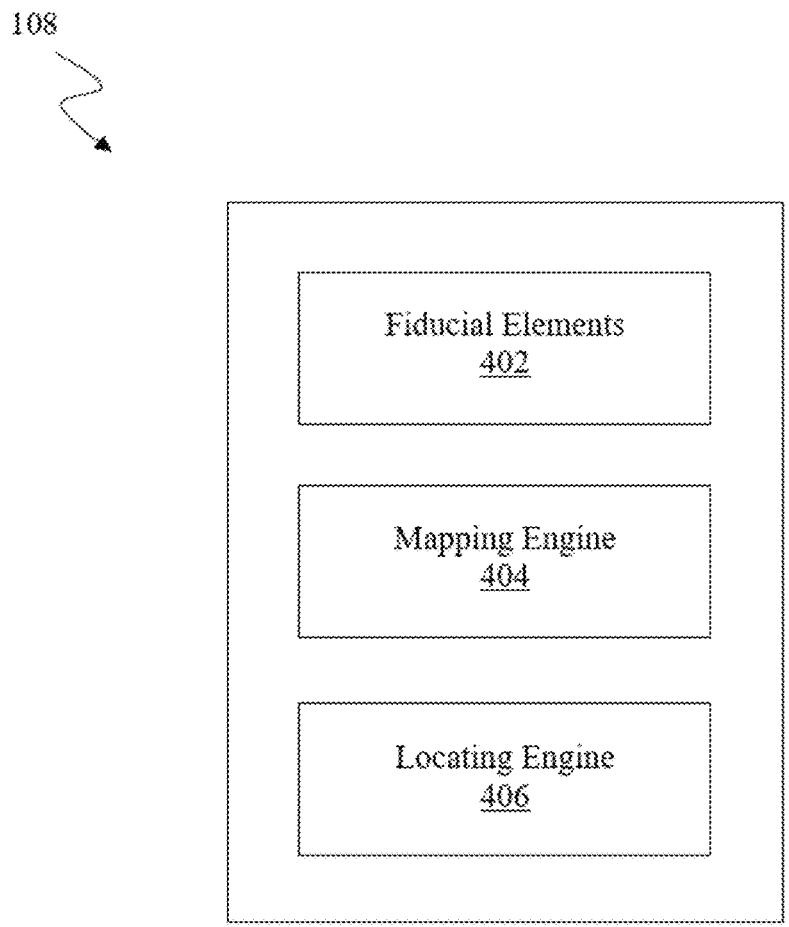
FIG. 5 is a block diagram of a game space recognition subsystem for multiple remotely-controlled aircraft, according to an embodiment.

Referring to FIG. 5, a block diagram of game space recognition subsystem 108 is depicted, according to an embodiment. Game space recognition subsystem 108 generally comprises a plurality of fiducial elements 402, a mapping engine 404, and a locating engine 406. It will be appreciated that the finite volume of game space 300 as described above contributes to the complexity of the determinations that must be performed by game space recognition subsystem 108. In various embodiments, particularly those that utilize only passive fiducial beacons 402, the game space volume 300 is smaller to simplify the requirements that game space recognition system 108 and mapping engine 404 must fulfill to adequately define the game space volume in which locating engine 406 can effectively identify and locate each relevant craft in the game space 300.

The subsystem includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Fiducial elements 302, 402, 502 may each comprise a beacon, marker, and/or other suitable component configured for mapping and locating each of the craft within a game space. In an embodiment, fiducial elements 402 are passive and comprise a unique identifier readable by other components of game space recognition subsystem 108. For example, fiducial elements 402 can comprise a "fiducial strip" having a plurality of unique markings along the strip. In other embodiments, fiducial elements 402 can include individual cards or placards having unique markings. A plurality of low-cost, printed fiducials can be used for entry-level game play.

In another embodiment, fiducial elements 302 are active and each include a transceiver configured for IR, RF-pulse, magnetometer, or ultrasound transmission. In embodiments, other active locating technology can also be utilized. In embodiments, active fiducial elements 302 can include "smart" fiducials 502 having a field-of-view camera. Fiducial elements can further be a combination of active elements 302, passive fiducial elements 402 and/or smart fiducial elements 502. In further embodiments, fiducial elements 302, 402, 502 may includes special fiducials that also represent game pieces like capture points, health restoring, defensive turrets, etc.

In embodiments, fiducial elements 302, 402, 502 can be spaced evenly or unevenly along the horizontal (X-axis) surface of the game space. In embodiments, fiducial elements 302, 402, 502 can be spaced evenly or unevenly along the vertical dimension (Z-axis) of the game space. For example, fiducial elements 302, 402, 502 can be spaced along a vertical pole placed within the game space. In most embodiments, vertical placement of fiducial elements 302, 402, 502 is not needed. In such embodiments, an altitude sensor of the craft provides relevant Z-axis data. Relative placement of fiducial elements 302, 402, 502 is described in additional detail with respect to FIGS. 8-10.

According to an embodiment, the maximum spacing between fiducials is a trade-off between minimum craft height and camera field of view. After calibration and assuming the height above the ground is known, game play can be implemented with a craft identifying only a single fiducial element continuously. In embodiments, the size of fiducial elements can be a function of the resolution of the camera, its field of view, or the required number of pixels on a particular fiducial element. Accordingly, the less information-dense the fiducial elements are, the smaller the implementation size can be.

Mapping engine 404 is configured to map the relative placement of the plurality of fiducial elements 302, 402, 502. In embodiments, mapping engine 404 is configured to map, with high certainty, the relative distance between each of the fiducial elements 302, 402, 502. Any error in fiducial positions can result in error in the estimated position of a craft. One skilled in the art will appreciate that smaller, environmentally-controlled game spaces require fewer fiducial elements. However, outdoor locations and larger areas require a larger quantity of fiducial elements or additional processing to determine the relative positions of fiducial elements 302, 402, 502. In embodiments, mapping engine 404 is configured to perform a calibration sequence of fiducial elements 302, 502.

In an embodiment of fiducial elements 302, 502 comprising active elements and/or smart elements, mapping engine 404 is configured to receive relative locations of fiducial elements 302, 502 as discovered by the respective elements. For example, wherein active fiducial elements 302, 502 comprise transmitting beacons, an IR, RF, or ultrasound pulse can be emitted by one or more of fiducial elements 302, 502 and received by the other fiducial elements 302, 502 and/or game controller station 304. The time of the pulse from transmission to reception by another fiducial element 302, 502 (i.e., time of flight analysis) can thus be utilized to determine a relative position between fiducial elements 302, 502. This data can be transmitted to mapping engine 404, for example, through game controller station 304 in FIG. 4. Mapping engine 404 can thus prepare or otherwise learn a relative map of the position of active fiducial elements 302, 502.

In an embodiment of fiducial elements 402 comprising passive elements, mapping engine 404 is configured to interface with image data to identify and prepare or otherwise learn a relative map of the position of fiducial elements. In one example, a calibration sequence includes obtaining or taking an image including fiducial elements 402 using a mobile device, such as device 106 or game controller station 304. The image can be transmitted or otherwise sent to mapping engine 404. Mapping engine 404 is configured to parse or otherwise determine the unique identifiers of fiducial elements 402 in order to prepare or otherwise learn a relative map of the position of fiducial elements 402. In embodiments, multiple images can be taken of the game space. For example, in a large game space, the resolution required to determine each unique fiducial element 402 may not fit in a single picture. Multiple "zoomed-in" pictures can be taken and stitched together using any number of photo composition techniques in order to generate a full image comprising all of the fiducial elements 402.

In another embodiment, as described above, craft can include one or more downward-facing cameras. In embodiments, such a craft is referred to here as a mapping craft during a calibration sequence that can include utilizing the mapping craft to initiate a mapping or reconnaissance flight to identify fiducial elements 302, 402, 502. For example, mapping craft can be automated to fly over the game space and visually capture fiducial elements 302, 402, 502 using the downward-facing camera. In another embodiment, a user can manual fly over the game space to visually capture fiducial elements 302, 402, 502 using the downward-facing camera.

According to an embodiment, during calibration, at least two and preferably three individual fiducial elements can be identified simultaneously. Using an estimated craft height (for example, from an altimeter) and the angle between the fiducials, a mapping can be created between all fiducial elements. In another embodiment, if mapping engine 404 can identify or otherwise know the size of the fiducial elements themselves, an altimeter is not necessary.

In another embodiment, a joint calibration of fiducial elements 302, 402 can includes using a "smart" fiducial 502. For example, each smart fiducial 502 can include a 180 degree field-of-view camera to "see" other fiducial elements. In an embodiment, a map can be created with at least two smart fiducials 502 that can independently view each other fiducial. In further embodiments, one or more smart fiducials 502 can be combined with mapping craft as described above, and/or may be combined with time of flight position calibration of fiducials 302 as described above.

As mentioned, fiducial elements can be combined among passive elements 402 and active elements 302. For example, four "corner" fiducial elements 302 and two "encoded" strings of passive elements 402 placed to crisscross between opposite corners can be utilized. In a further embodiment, encoded strings can be placed to crisscross between adjacent corners. According to an embodiment, for example, if the corners of the game space are no more than 30 feet apart and the craft is three feet above the ground, a downward facing camera on the craft can locate at least one string. Corner elements can be passive or active, as described herein.

Locating engine 406 is configured to locate the position of craft within the game space using the data from mapping engine 404 and optionally, craft data. For example, IR, RF, or ultrasound beacons can emit a pulse that is received or returned by a particular craft. A triangulation calculation or measurement can be utilized in order to determine the distances and relative positions of craft over the game space using the pulse data. In an embodiment, at least two beacons are utilized in combination with a sensor reading from the craft in order to triangulate the relative position of the craft on the game space. In another embodiment, at least three beacons are utilized to determine the relative position of the craft on the game space. More than two beacons can be combined to improve accuracy, but most game play does not require it.

In other embodiments of craft having a downward facing camera, a relative location can be determined by the data returned from the camera. Relative craft position can be determined based on the map of the game space created during calibration as implemented by mapping engine 404.

In an embodiment, the craft can be launched within the game space at a predetermined or known location relative to the fiducial elements. This allows embodiments of locating engine 406 to initiate with another data point for locating the craft within the game space. See, for example, FIG. 10.

Referring to FIG. 5, a block diagram of one embodiment of locating engine 406 is described that utilizes both sensors and/or information obtained from onboard the craft 102, and sensors and/or information from external references and/or sources that are combined in a data fusion process to provide the necessary location information consisting of both positional information of a relative position in the game space 300 and orientation information of the craft at the given point indicated by the positional information.

With respect to the onboard sensors in this embodiment, during initialization, an initial pitch and roll estimate of craft 102 is estimated using the accelerometers to observe an orientation of craft 102 relative to gravity with the assumption that no other accelerations are present. The craft heading or yaw can be initialized using the magnetometer or may simply be set to zero. As typically performed by Attitude Heading and Reference Systems (AHRS), data from the gyroscope is continually integrated at each time step to provide a continual estimate of the attitude of craft 102. Noise present in the gyroscope signal will accumulate over time resulting in an increasing error and may be corrected and or normalized using information from other sensors. The accelerometer data is used to provide measure the orientation of the craft 102 relative to gravity. As the accelerometers measure both the effect of gravity as well as linear accelerations, linear accelerations will corrupt this measurement. If an estimate is available, body accelerations can be removed. Additionally, if an estimate of the craft orientation is available, it can be used to remove the gravity vector from the signal and the resulting body acceleration measurements can be used to aid the position tracking estimate.

In some embodiments, a magnetometer on the craft 102 can be used to measure the orientation of the craft relative to earth's magnetic field vector. Using both the magnetic and gravitational vectors provide an absolute reference frame to estimate a three-dimensional orientation of the craft.

In some embodiments, a dynamic measurement of a relative altitude of craft 104 may be obtained. In various embodiments, a barometer can be used to measure the air pressure of the craft. As the craft rises in altitude, the air pressure drops. Using the relationship between altitude and barometric pressure, an estimate of the craft's altitude relative to sea level can be made. Typically, the barometric pressure is measured while the craft is on the ground to determine the ground's altitude above sea level and allows for a rough estimate of the craft's height above ground. In other embodiments, an ultrasonic range finder can be used to measure the craft's height above ground and/or walls by transmitting and receiving sound pulses. Typically, the ultrasonic sensor is fixed to the craft, so the current attitude estimate for craft 104 is used to correct the estimate. Similar to an ultrasonic range finder, in some embodiments a time of flight sensor can use LED or laser light to transmit a coded signal. The reflection of the light is received and correlated to the transmitted signal to determine the time of flight of the signal and thereby the distance to the reflecting target.

In some embodiments, a downward-facing camera or an optical flow sensor may be used to monitor the motion of a scene that can include one or more fiducials, and this information can be analyzed and processed along with knowledge of an orientation and a distance to a fiducial, for example, which can be used to calculate a relative position and velocity between the craft and the fiducial and/or another know object in the scene within the gaming space (i.e., floor or walls).

In other embodiments, an onboard camera on the craft can be used to image visual targets such as fiducials on the ground, the floor, or even other remotely-controlled aircraft of other remote control object within the game space. A vector can be determined for each visual target identified that connects a focal point of the camera with the target as measured by a pixel location of the target. If the location of a given target is known in the local coordinate frame of the game space, the position of the remotely-controlled aircraft within the three-dimensional game space can be estimated using the intersection of these vectors. If the size of the targets is known, their imaged size in pixels and the camera's intrinsic properties also can be used to estimate the distance to the target.

In various embodiments, a commanded thrust output for the craft can be used along with a motion model of the craft to aid the tracking system providing estimates of its future orientation, acceleration, velocity and position.

With respect to the onboard sensors in various embodiments, a video camera can be used with computer vision algorithms in one or more of the smart fiducials 502 and/or the gaming controller to determine a location of a craft in the field of view of the video camera along with its relative orientation. Using the pixel location of the identified craft, a vector from the camera in a known location within the gaming space to the craft can be estimated. Additionally, if the physical size of the craft and camera's intrinsic imaging properties are known, the distance to the craft can also be estimated. Using multiple cameras, multiple vectors to each craft can be determined and their intersections used to estimate the three-dimensional position of the remotely-controlled aircraft within the gaming space.

In other embodiments, to aid in the computer vision tracking of the craft by external references, the visual fiducial markers 402 may be used. These markers are designed to be easily seen and located in the field of view of the external reference camera. By arranging the fiducials on the target in a known pattern, orientation and distance tracking can be improved using this information.

A time of flight camera or a LIDAR array sensor may also be used in various embodiments of the external references to generate a distance per pixel to the target. It illuminates the scene with a coded light signal and correlates the returns to determine the time of flight of the transmitted signal. The time of flight camera or a LIDAR array sensor can provide a superior distance measurement than just using the imaged craft size. Examples of a LIDAR array sensor that may be small enough and light enough to be suitable for use in some embodiments described herein is shown in U.S. Publ. No. 2015/0293228, the contents of which are hereby incorporated by reference.

In various embodiments, when the available sensor measurements and information from onboard and/or external references is obtained, this information together with the corresponding mathematical models applicable to such information, may be combined in a data fusion process to create estimates with lower error rates for determining the location, position and orientation than any single sensor. This estimate may also be propagated through time and continually updated as new sensor measurements are made. In various embodiments, the data fusion process is accomplished by using an Extended Kalman Filter or its variants (i.e. Unscented Kalman Filter). In various embodiments, the data fusion process is performed by the locating engine 406.

Figure 6:
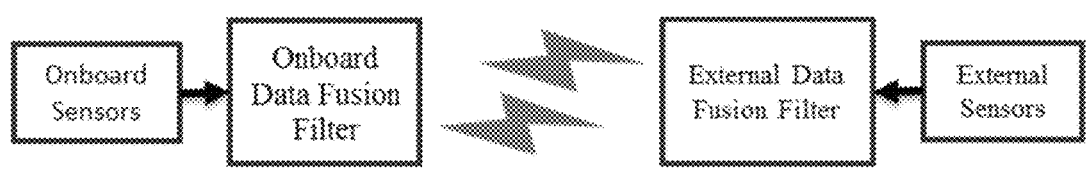
FIG. 6 is a block diagram of a locating engine 601 that determines position, orientation and location information of multiple remotely-controlled aircraft, according to an embodiment.

FIG. 6 is a block diagram of a locating engine 601 that determines position, orientation and location information of multiple remotely-controlled aircraft, according to an embodiment. In some embodiments, locating engine 601 is an implementation of locating engine 406 described above.

Figure 7A:
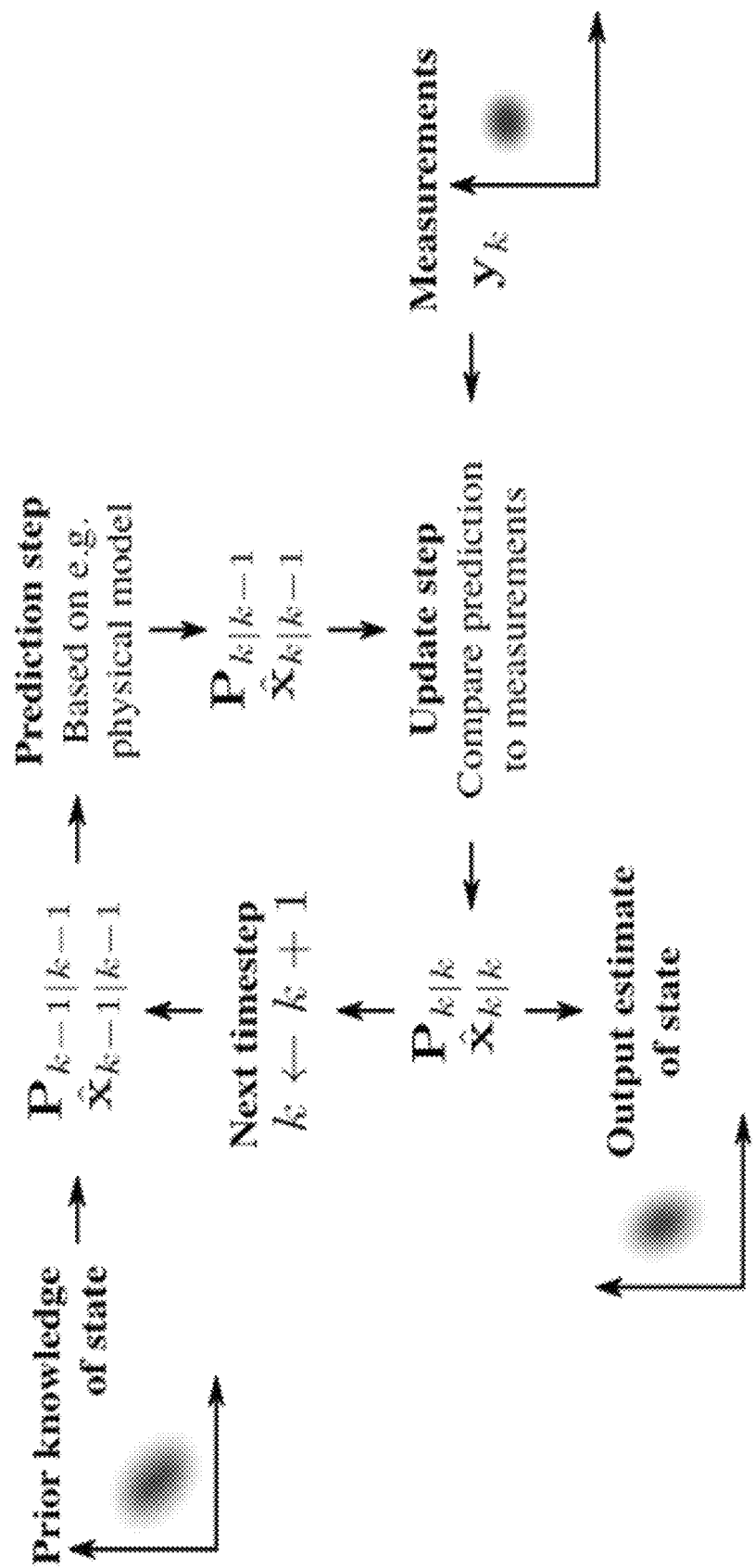

FIGS. 7A and 7B, together, which are adapted from the Wikipedia internet website entry for Kalman filter, depict an exemplary set 701 of algorithms and formulas that may be implemented, in some embodiments, by the locating engine 601 to perform the data fusion process, both for initial prediction and for subsequent update of the location information.

Figure 8:
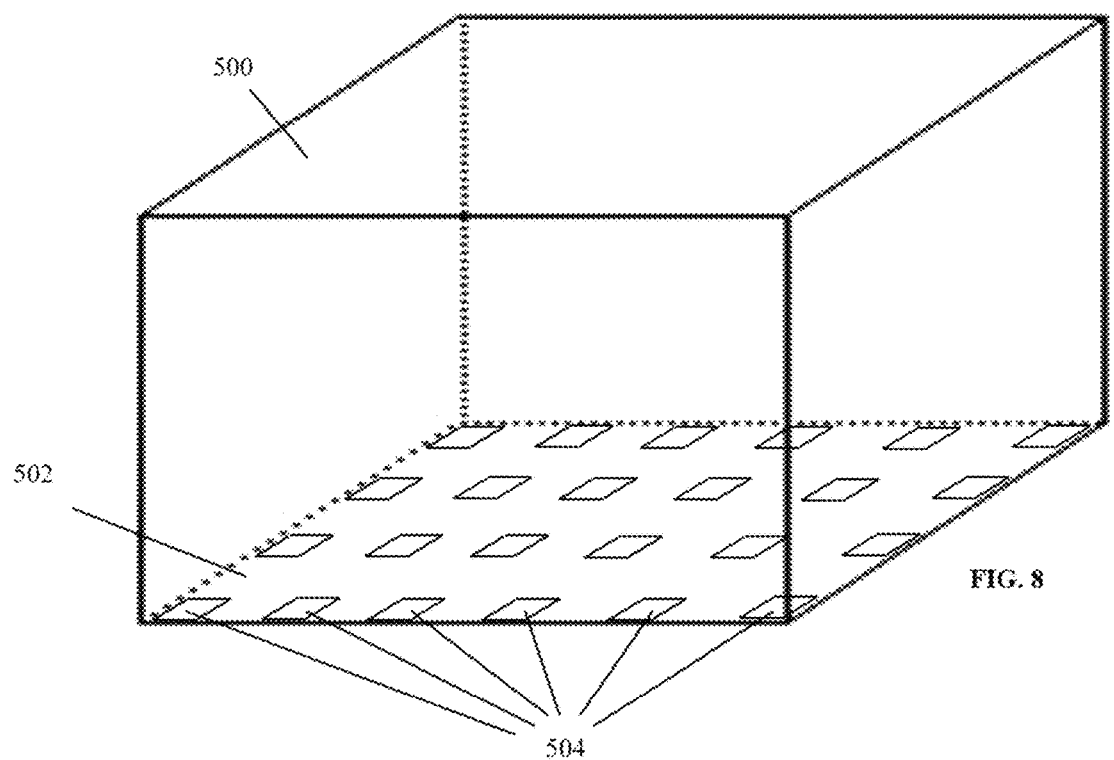
FIG. 8 is a diagram of the fiducial marker mat 502 deployed in a game space, according to an embodiment.

Referring to FIG. 8, a diagram of a fiducial marker mat 502 for a game space 500 is depicted, according to an embodiment. As shown, game space 500 comprises a three-dimensional space in which two or more craft can be launched and fly in accordance with a particular game. Once fiducial marker mat 502 is deployed onto game space 500, fiducial marker mat 502 comprises a net of visual targets 504 evenly spaced at the respective intersections of the netting. In an embodiment, fiducial marker mat 502 is unrolled on the playing surface "floor." Each visual target 504 comprises a unique identifier readable by an image-recognition device. Accordingly, the relative distance and angle of each of the unique visual targets 504 from other unique visual targets 504 can be easily determined. In other embodiments, visual targets 504 are not positioned at respective intersections of the netting, but are otherwise spaced along the surface of fiducial marker mat 502. As shown in FIG. 8, fiducial marker mat 502 is stretched out on the floor of game space 500.

Figure 9:
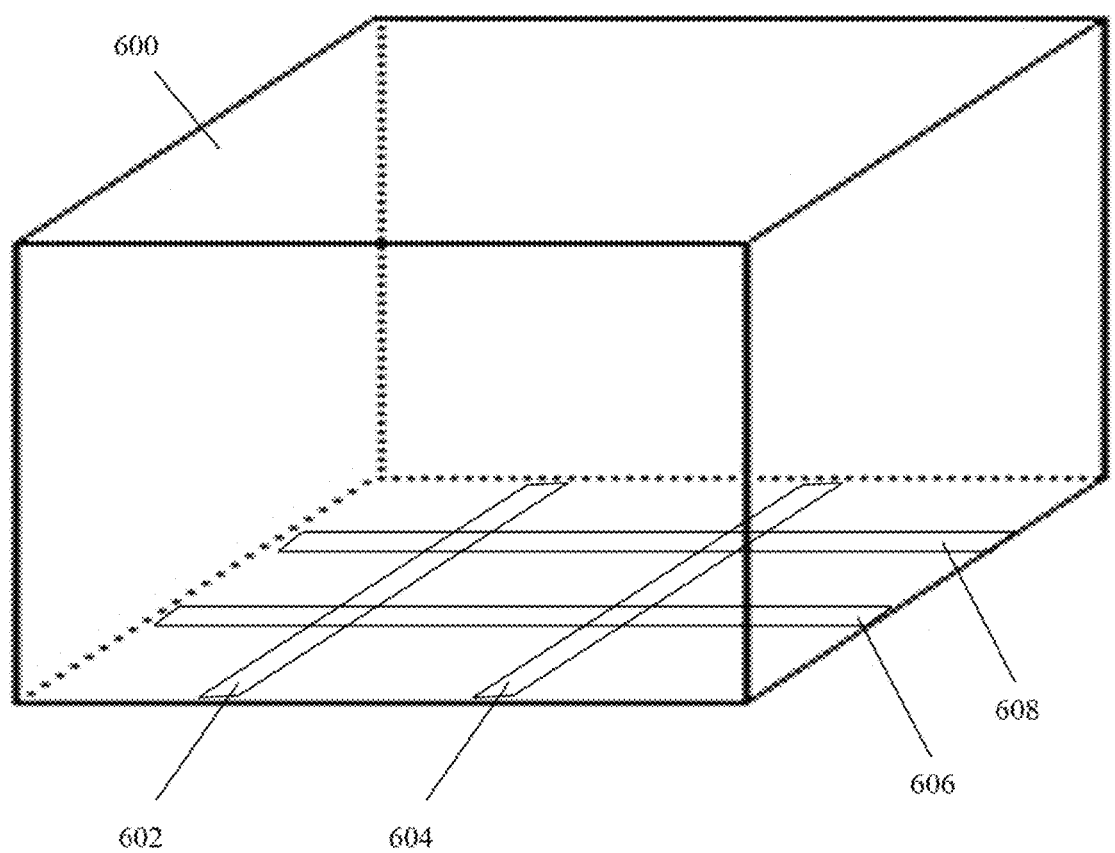
FIG. 9 is a diagram of a plurality of fiducial marker ribbon strips for a game space for a gaming system for multiple remotely-controlled aircraft, according to an embodiment.

Referring to FIG. 9, a diagram of a plurality of fiducial marker ribbon strips for a game space for a gaming system for multiple remotely-controlled aircraft is depicted, according to an embodiment. As shown, game space 600 comprises a three-dimensional space in which two or more craft can be launched and fly in accordance with a particular game.

A plurality of two-dimensional 1-D ribbon strips are positioned in a fiducial grid along the playing surface "floor." For example, first strip 602 and second strip 604 are positioned adjacent and parallel each other, but spaced from each other along the floor. Likewise, third strip 606 and fourth strip 608 are positioned adjacent and parallel each other, but spaced from each other along the floor. Third strip 606 and fourth strip 608 are positioned orthogonal to first strip 602 and second strip 604 to form known angles with respect to each other.

Similar to visual targets 504, each of first strip 602, second strip 604, third strip 606, and fourth strip 608 can comprise a plurality of a unique identifiers along the surface of the respective strip that are readable by an image recognition device.

Figure 10:
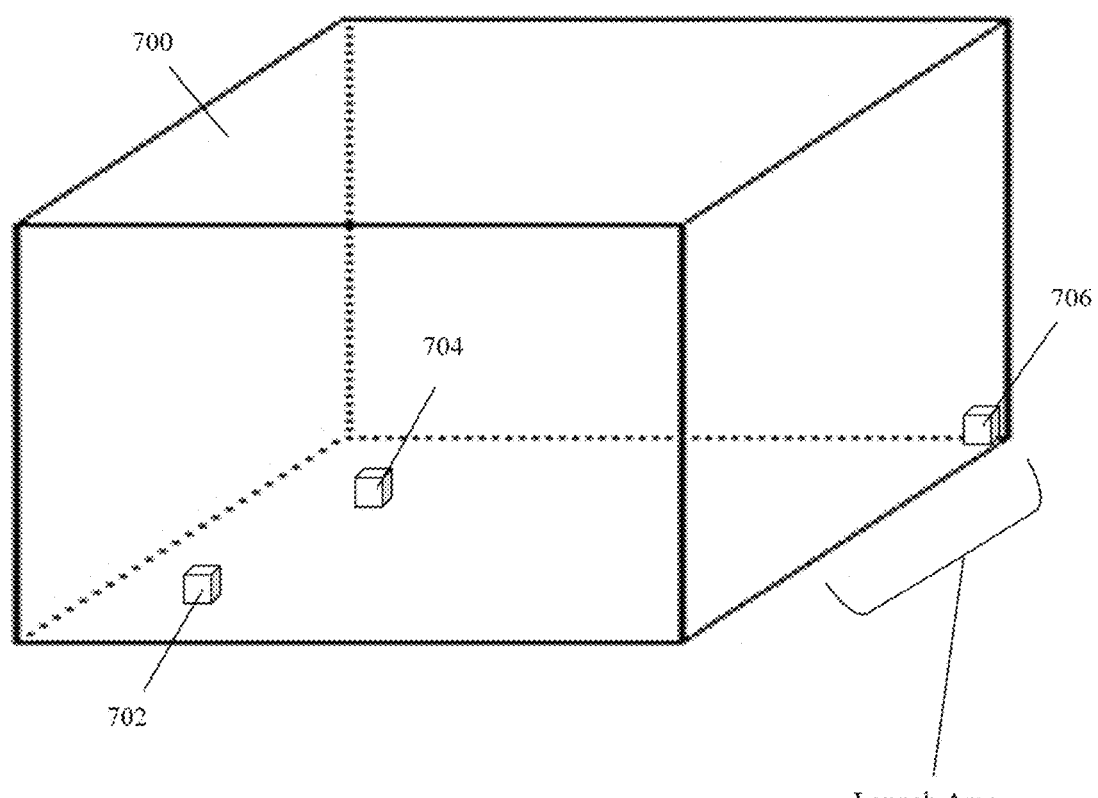
FIG. 10 is a diagram of a fiducial beacon grid for a game space for a gaming system for multiple remotely-controlled aircraft, according to an embodiment.

Referring to FIG. 10, a diagram of a fiducial beacon grid for a game space for a gaming system for multiple remotely-controlled aircraft is depicted, according to an embodiment. As shown, game space 700 comprises a three-dimensional space in which two or more craft can be launched and fly in accordance with a particular game.

A plurality of fiducial beacons are positioned in a fiducial grid along the playing surface "floor." For example, fiducial beacon 702 and fiducial beacon 704 are positioned largely within the main area of the playing surface floor. Fiducial beacon 706 is positioned proximate one of the corners of game space 700. In an embodiment, a craft launch area 708 is adjacent fiducial beacon 706. By positioning launch area 708 at a site known to fiducial beacon 706, locating the craft is easier with this initial known data point.

Figure 11:
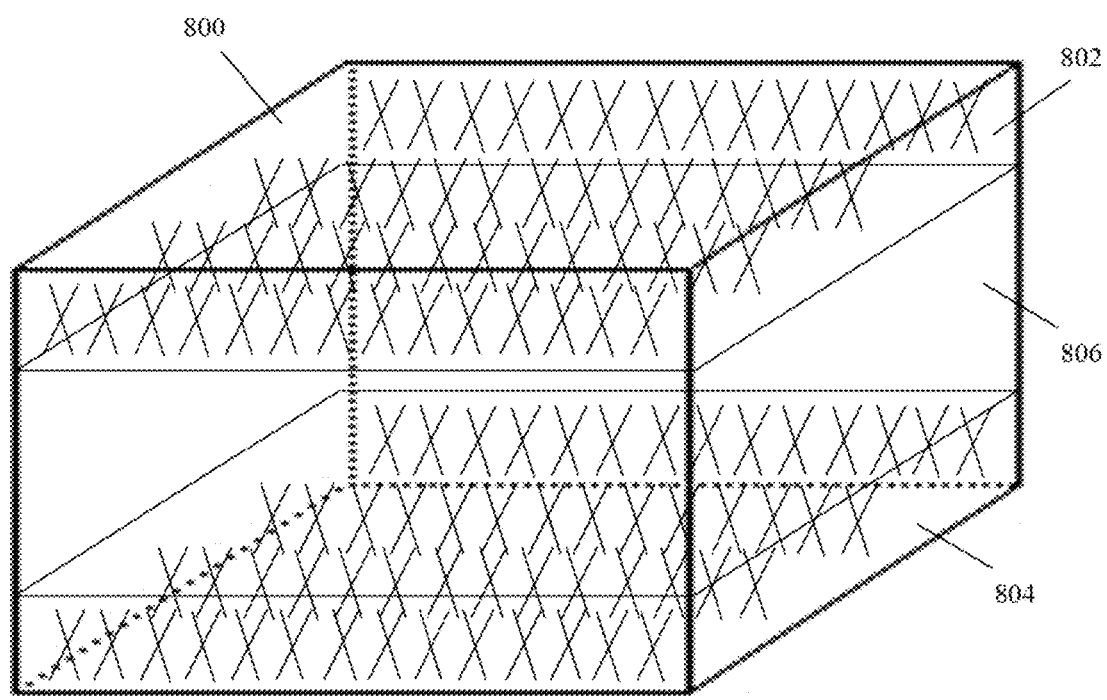
FIG. 11 is a diagram of a game space space having an out-of-bounds area for a gaming system for multiple remotely-controlled aircraft, according to an embodiment.

Referring to FIG. 11, a diagram of a game space space having an out-of-bounds area for a gaming system for multiple remotely-controlled aircraft is depicted, according to an embodiment. As shown, game space 800 comprises a three-dimensional space in which two or more craft can be launched and fly in accordance with a particular game.

Game space 800 generally comprises a three-dimensional upper out-of-bounds area 802, a three-dimensional lower out-of-bounds area 804, and a three-dimensional in-play area 806. In an embodiment, upper out-of-bounds area 802 comprises the three-dimensional area within game space 800 wherein the Z-axis is above 10 feet. In other embodiments upper out-of-bounds area 802 comprises a three-dimensional area within game space 800 greater or less than 10 feet.

In an embodiment, lower out-of-bounds area 804 comprises the three-dimensional area within game space 800 wherein the Z-axis is under 1 foot. In other embodiments lower out-of-bounds area 804 comprises a three-dimensional area within game space 800 greater or less than 1 foot.

As described herein with respect to a craft touching one of the sides of a game space, when a craft moves into an out of bounds location, such as upper out-of-bounds area 802 or lower out-of-bounds area 804, a command can be transmitted to the craft that artificially weakens or disables the flying ability of the craft. In other embodiments, other penalties or actions can be taken with respect to the craft or game play when craft moves into these out of bounds locations.

Figure 12:
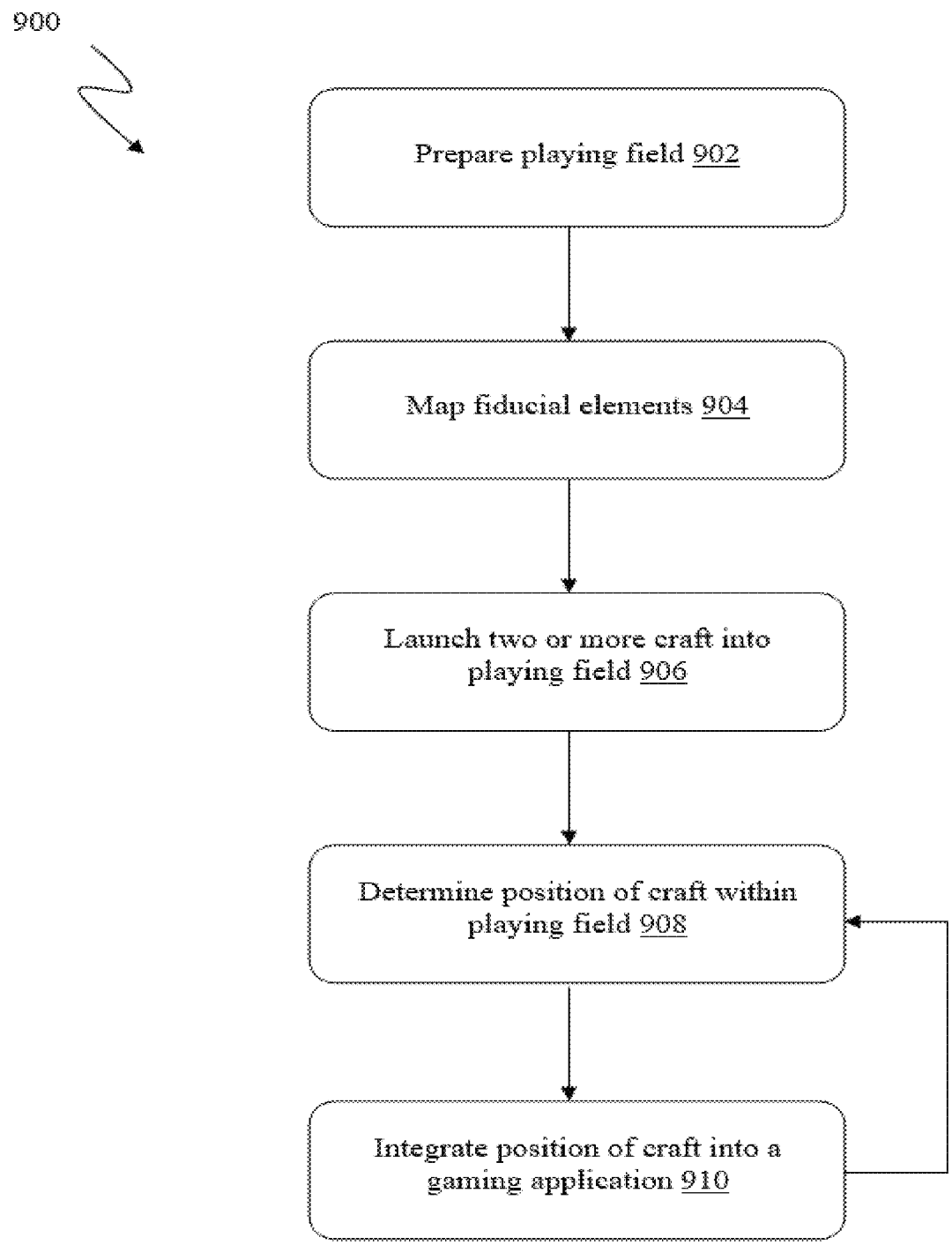
FIG. 12 is a flowchart of a method of integrating three-dimensional game play among remotely-controlled craft on a gaming application for a mobile device, according to an embodiment.

In operation, referring to FIG. 12, a flowchart of a method 900 of integrating three-dimensional game play among multiple remote control aeronautical vehicles on a gaming application for a mobile device is depicted, according to an embodiment.

At 902, a game space is prepared. In embodiments, two or more users can physically bring two or more remote control aeronautical vehicles to an area in which the vehicles can be flown as a part of game play. Further, referring to FIG. 4, a gaming controller station to coordinate the positional data of the craft can be set up adjacent the game space. In embodiments, one or more mobile devices implementing a gaming application are powered on, initiated, or otherwise prepared for use. Finally, at least two fiducial elements are deployed on the horizontal (X-axis) surface of the game space. Fiducial elements can include both active and passive elements and can include various placements or configurations as described in, for example, FIGS. 5 and 8-10.

At 904, the fiducial elements are mapped. Referring to mapping engine 404, a map of fiducial elements on the game space is generated. In embodiments, both active and passive fiducial elements can be mapped according to their respective mapping processes. The generated map data can be transmitted to the mobile device and/or the gaming controller station for use with the gaming application.

At 906, two or more craft are launched into the game space. In an embodiment, the craft are launched at a specified launch area such as launch area 708 in FIG. 10.

At 908, the craft are located within the game space. Referring to locating engine 406, active fiducial elements, passive fiducial elements, and/or the craft including a down-ward-facing camera can be used to triangulate the craft position within the game space. This data is aggregated as position data and transmitted to one or more of the device, gaming controller station, or other system components.

At 910, the position data of the craft is integrated into the gaming application and displayed on the mobile device. The three-dimensional position data is filtered or otherwise synthesized to represent two-dimensional data. In embodiments, the three-dimensional position data can be further integrated into game play features, such as health, power boost, "hiding" locations, and others, depending on the game.

Steps 908 and 910 can be iterated to update the position location of the craft within the gaming application according to any desired update rate.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A gaming system integrating three-dimensional real-world game play and virtual game play, the system comprising:
  at least two remotely-controlled aircraft and at least two controllers, each aircraft uniquely paired with and controlled by a corresponding one of the at least two controllers via a radio-frequency (RF) communication protocol implemented between the corresponding controller and the remote-control craft that transmits at least craft control communications between a particular pair of a controller and a remotely-controlled aircraft based on a pair identification information contained in the RF communication protocol, the RF communication protocol further including communication of sensor and positional information;
  a game space recognition system including:
    at least two fiducial elements placed relative to one another to define a three-dimensional game space, and
    a locating engine configured to utilize the at least two fiducial elements and sensor and positional information received via the RF communication protocol to determine a relative position and orientation of each of the at least two remotely-controlled aircraft within a locally-defined coordinate frame of reference associated with the game space;
  at least one mobile computing device configured to execute a gaming application wherein the relative position of each of the at least two remotely-controlled aircraft is utilized by the gaming application to determine game play associated with an integrated real and virtual game played among at least two remotely-controlled aircraft within the three-dimensional game space in accordance with a set of rules and parameters for the integrated real and virtual game, wherein the integrated real and virtual game defines at least one zone selected from the group consisting of:
    a health zone that, when a first one of the at least two remotely-controlled aircraft is located within the health zone, provides a relative advantage over a second one of the at least two remotely-controlled aircraft that is not located within the health zone, and
    a hiding zone of virtual mountains that, when a first one of the at least two remotely-controlled aircraft is located within the hiding zone, protects the first aircraft from shots fired by a virtual cannon.

2. The gaming system of claim 1, wherein the integrated real and virtual game defines the hiding zone of virtual mountains.

3. The gaming system of claim 1, further comprising a plurality of physical markers, wherein the integrated real and virtual game defines a virtual element corresponding to each of the plurality of physical markers.

4. The gaming system of claim 1, further comprising:
  a beacon that emits pulses that are received or returned by a selected one of the at least two remotely-controlled aircraft, and a measurement based on the emitted pulses is used by the locating engine to locate a position of the selected aircraft.

5. The gaming system of claim 1, wherein the at least one mobile computing device executing the gaming application is a smartphone device physically separate from the at least two remotely-controlled aircraft.

6. A gaming system integrating three-dimensional real-world game play and virtual game play, the system comprising:
  at least two remotely-controlled aircraft and at least two controllers, each aircraft uniquely paired with and controlled by a corresponding one of the at least two controllers via a radio-frequency (RF) communication protocol implemented between the corresponding controller and the remote-control craft that transmits at least craft control communications between a particular pair of a controller and a remotely-controlled aircraft based on a pair identification information contained in the RF communication protocol, the RF communication protocol further including communication of sensor and positional information;
  a game space recognition system including:
    at least two fiducial elements placed relative to one another to define a three-dimensional game space, and
    a locating engine configured to utilize the at least two fiducial elements and sensor and positional information received via the RF communication protocol to determine a relative position and orientation of each of the at least two remotely-controlled aircraft within a locally-defined coordinate frame of reference associated with the game space;
  at least one mobile computing device configured to execute a gaming application wherein the relative position of each of the at least two remotely-controlled aircraft is utilized by the gaming application to determine game play associated with an integrated real and virtual game played among at least two remotely-controlled aircraft within the three-dimensional game space in accordance with a set of rules and parameters for the integrated real and virtual game; and
  a mapping engine,
  wherein the game space recognition system further includes at least one image-acquisition device selected from the group consisting of:
    a camera on at least one of the at least two remotely-controlled aircraft,
    an ultrasonic range finder altimeter and a camera on at least one of the at least two remotely-controlled aircraft, and
    a 180-degree field-of-view camera on each of the at least two fiducial elements,
  wherein the image-acquisition device is operable to obtain at least one image of the at least two fiducial elements, and wherein the mapping engine is configured to determine unique identifiers of the at least two fiducial elements in order to prepare a relative map of positions of the at least two fiducial elements.

7. The gaming system of claim 6 wherein the game space recognition system includes the camera on at least one of the at least two remotely-controlled aircraft.

8. The gaming system of claim 6, further comprising:
wherein the game space recognition system includes the ultrasonic range finder altimeter and a camera on at least one of the at least two remotely-controlled aircraft, and
wherein the mapping engine is further configured to determine an estimated craft height, and angles between the fiducial elements.

9. A gaming system integrating three-dimensional real-world game play and virtual game play, the system comprising:
at least two remotely-controlled aircraft and at least two controllers, each aircraft uniquely paired with and controlled by a corresponding one of the at least two controllers via a radio-frequency (RF) communication protocol implemented between the corresponding controller and the remote-control craft that transmits at least craft control communications between a particular pair of a controller and a remotely-controlled aircraft based on a pair identification information contained in the RF communication protocol, the RF communication protocol further including communication of sensor and positional information;
a game space recognition system including:
at least two fiducial elements placed relative to one another to define a three-dimensional game space, and
a locating engine configured to utilize the at least two fiducial elements and sensor and positional information received via the RF communication protocol to determine a relative position and orientation of each of the at least two remotely-controlled aircraft within a locally-defined coordinate frame of reference associated with the game space; and
at least one mobile computing device configured to execute a gaming application wherein the relative position of each of the at least two remotely-controlled aircraft is utilized by the gaming application to determine game play associated with an integrated real and virtual game played among at least two remotely-controlled aircraft within the three-dimensional game space in accordance with a set of rules and parameters for the integrated real and virtual game, wherein the at least two fiducial elements include a plurality of encoded strings of passive fiducial elements placed to crisscross between corners of the game space.

10. A method of integrating three-dimensional real-world game play and virtual game play, the method comprising:
providing at least one mobile computing device, at least two remotely-controlled aircraft and at least two controllers;
uniquely pairing each aircraft with a corresponding one of the at least two controllers via a radio-frequency (RF) communication protocol implemented between the corresponding controller and the remote-control craft;
transmitting at least craft-control communications between a particular pair that includes one of the at least two controllers and a corresponding one of the at least two remotely-controlled aircraft based on pair-identification information contained in the RF communication protocol, the RF communication protocol further including communication of sensor and positional information;
defining a three-dimensional game space using at least two fiducial elements placed relative to one another to define the game space;
associating a locally-defined coordinate frame of reference with the three-dimensional game space;
utilizing the at least two fiducial elements and sensor and positional information received via the RF communication protocol to determine a relative position and orientation of each of the at least two remotely-controlled aircraft within the locally-defined coordinate frame of reference associated with the three-dimensional game space;
executing a gaming application on the at least one mobile computing device, wherein the relative positions and orientations of each of the at least two remotely-controlled aircraft are utilized by the gaming application to determine game play associated with an integrated real and virtual game played among at least two remotely-controlled aircraft within the three-dimensional game space in accordance with a set of rules and parameters for the integrated real and virtual game play; and
defining at least one zone selected from the group consisting of:
a hiding zone of virtual mountains that, when a first one of the at least two remotely-controlled aircraft is located within the hiding zone, protects the first aircraft from shots fired by a virtual cannon, and
a health zone that, when a first one of the at least two remotely-controlled aircraft is located within the health zone, provides a relative advantage over a second one of the at least two remotely-controlled aircraft that is not located within the health zone.

11. The method of claim 10, further comprising:
defining a virtual element corresponding to each of a plurality of physical markers placed on the game space.

12. The method of claim 10, further comprising:
executing the gaming application on a smartphone device physically separate from the at least two remotely-controlled aircraft.

13. A method of integrating three-dimensional real-world game play and virtual game play, the method comprising:
providing at least one mobile computing device, at least two remotely-controlled aircraft and at least two controllers;
uniquely pairing each aircraft with a corresponding one of the at least two controllers via a radio-frequency (RF) communication protocol implemented between the corresponding controller and the remote-control craft;
transmitting at least craft-control communications between a particular pair that includes one of the at least two controllers and a corresponding one of the at least two remotely-controlled aircraft based on pair-identification information contained in the RF communication protocol, the RF communication protocol further including communication of sensor and positional information;
defining a three-dimensional game space using at least two fiducial elements placed relative to one another to define the game space;
associating a locally-defined coordinate frame of reference with the three-dimensional game space;

utilizing the at least two fiducial elements and sensor and positional information received via the RF communication protocol to determine a relative position and orientation of each of the at least two remotely-controlled aircraft within the locally-defined coordinate frame of reference associated with the three-dimensional game space;

executing a gaming application on the at least one mobile computing device, wherein the relative positions and orientations of each of the at least two remotely-controlled aircraft are utilized by the gaming application to determine game play associated with an integrated real and virtual game played among at least two remotely-controlled aircraft within the three-dimensional game space in accordance with a set of rules and parameters for the integrated real and virtual game play;

obtaining images selected from the group consisting of:
images from each of the at least two remotely-controlled aircraft, and
images from each of the at least two fiducial elements; and using the images to create a map of the game space.

14. The method of claim 13, further comprising:
obtaining the images from each of the at least two fiducial elements.

15. The method of claim 13, further comprising:
obtaining the images from each of the at least two remotely-controlled aircraft; and
obtaining estimated height data from each of the at least two remotely-controlled aircraft.

16. The method of claim 13, further comprising:
obtaining the images from each of the at least two remotely-controlled aircraft; and
using the images to locate three-dimensional location and orientation information for each of the at least two remotely-controlled aircraft.

17. The method of claim 13, further comprising:
executing the gaming application on a smartphone device physically separate from the at least two remotely-controlled aircraft.

18. A method of integrating three-dimensional real-world game play and virtual game play, the method comprising:
providing at least one mobile computing device, at least two remotely-controlled aircraft and at least two controllers;

uniquely pairing each aircraft with a corresponding one of the at least two controllers via a radio-frequency (RF) communication protocol implemented between the corresponding controller and the remote-control craft;

transmitting at least craft-control communications between a particular pair that includes one of the at least two controllers and a corresponding one of the at least two remotely-controlled aircraft based on pair-identification information contained in the RF communication protocol, the RF communication protocol further including communication of sensor and positional information;

defining a three-dimensional game space using at least two fiducial elements placed relative to one another to define the game space;

associating a locally-defined coordinate frame of reference with the three-dimensional game space;

utilizing the at least two fiducial elements and sensor and positional information received via the RF communication protocol to determine a relative position and orientation of each of the at least two remotely-controlled aircraft within the locally-defined coordinate frame of reference associated with the three-dimensional game space;

executing a gaming application on the at least one mobile computing device, wherein the relative positions and orientations of each of the at least two remotely-controlled aircraft are utilized by the gaming application to determine game play associated with an integrated real and virtual game played among at least two remotely-controlled aircraft within the three-dimensional game space in accordance with a set of rules and parameters for the integrated real and virtual game play; and obtaining magnetic and gravitational vectors from each respective one of the at least two remotely-controlled aircraft to provide an absolute reference frame to estimate a three-dimensional orientation of the respective aircraft.

* * * * *